United States Patent Office 3,378,592
Patented Apr. 16, 1968

3,378,592
PROCESS FOR THE PRODUCTION OF 3,4-DIHY-DROXYBENZYLOXYAMINEHYDROBROMIDE
Wilson B. Lutz, North Manchester, Ind., assignor to Warner-Lambert Pharmaceutical Company, Morris Plains, N.J., a corporation of Delaware
No Drawing. Filed June 4, 1963, Ser. No. 285,198
1 Claim. (Cl. 260—621)

The present invention relates to new and novel substituted benzyloxyamines of the formula:

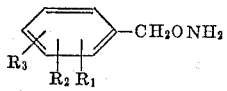

wherein $R_1$ represents hydrogen, hydroxy, lower alkyl or lower alkoxy, and $R_2$ and $R_3$ each represents hydroxy, lower alkyl and lower alkoxy, and to the non-toxic acid addition salts thereof. The present invention also relates to new and novel methods of preparing the above poly-substituted benzyloxyamines.

The terms "lower alkyl" and "lower alkoxy" as used in the specification and in the claims refer to branched and straight chain aliphatic groups having 1 to 6 carbon atoms.

The compounds of this invention exhibit significant pharmacological activity and are useful in the treatment of ailments associated with the cardiovascular system, such as hypertension or hypercholesteremia. In addition, they are valuable starting materials for the production of other substituted benzyloxyamines.

Included within the scope of this invention are those poly-substituted benzyloxyamines, such as, 3,4,5-trimethoxybenzyloxyamine hydrochloride, 3,4-dimethylbenzyloxyamine, 3,4-dihydroxybenzyloxyamine, 3,4-dimethoxybenzyloxyamine and the like.

It has also been found that the compounds of the above formula wherein the substituents are hydroxy radicals may be prepared by a process which consists in reacting 3,4-methylenedioxybenzyl chloride;

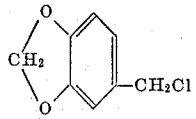

with phosphorous pentachloride to give a compound of the formula:

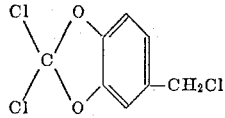

which when reacted with formic acid gives a compound of the formula:

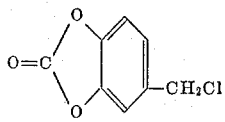

and when the latter is reacted in turn with N-hydroxybenzyl urethane in the presence of a weak base such as triethylamine, a reaction product of the following structural formula is obtained:

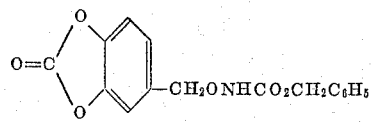

The above reactions are preferably carried out employing a substantially inert solvent reaction medium. Solvents such as dimethylformamide, acetonitrile or pyridine are particularly suitable. A temperature range of from about 70° C. to 160° C. is generally employed in effecting these reactions.

To obtain certain compounds of the present invention, the intermediate compounds of the formula:

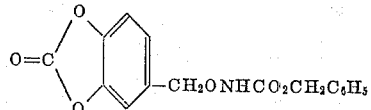

which are obtained as the product of the above-described reactions are first treated with concentrated hydrobromic acid and hydrolysed in an acidic media to obtain first a compound of the formula:

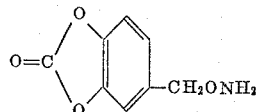

and finally a compound of the formula:

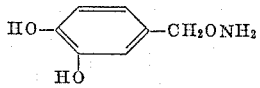

which is, of course, the desired hydroxy substituted benzyloxyamine of this invention. Suitable strengths of hydrobromic acid which can be employed to effect the hydrolysis are from about 2 N to about 4 N.

When the substituents desired in the aromatic ring of benzyloxyamines are lower alkyl, or lower alkoxy, a different process is generally employed.

The process is a two-step procedure comprising first the reaction of an aromatic halide of the formula $ArCH_2X$ wherein Ar represents a substituted aromatic radical such as 3,4-dimethoxyphenyl or 3,4-dimethylphenyl and X is halogen, such as chlorine, bromine and iodine with phthaloxime in the presence of triethylamine. Illustrative of the starting materials are 3,4-dimethoxybenzylchloride, 3,4-dimethyl benzylchloride and the like. The reaction may be represented by the following equation:

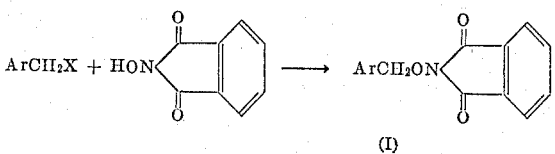

(I)

The second step involves the reaction with hydrazine of the N-substituted benzyloxyphthalimide (I) obtained in the first step to obtain the corresponding alkyl- or alkoxy-substituted benzyloxyamine.

The novel compounds of this invention contain a basic nitrogen which can form acid addition salts with acids. Such salts are readily prepared by the usual methods, such as, for example, by the reaction of the stoichiometrically equivalent amount of the base and the desired acid in an inert common solvent. Examples of acids which are suitable for the preparation of acid addition salts of the amine base of this invention are inorganic acids, such as, for example, hydrochloric, nitric, sulfuric, phosphoric and the like acids, and organic acids, such as, for example, benzoic, acetic, salicyclic, maleic, tartaric, citric and the like acids. The preferred salts are those which are pharmaceutically acceptable, that is, they are acid addition salts which are no more toxic than the bases from which they are prepared and which possess the necessary physical properties that render them suitable for incorporation into dosage forms in combination with the desired pharmaceutical carriers.

For therapeutic use, the compounds can be utilized in the form of the aqueous solutions of their acid addition salts, or the salts or bases can be combined with various inert pharmaceutical diluents or carriers into dosage forms such as, for example, tablets, capsules, elixirs, suspensions and the like.

In order further to illustrate this invention but without being limited thereto, the following examples are given:

EXAMPLE 1

Preparation of N-(3,4-dimethoxybenzyloxy)phthalimide: 13.8 grams of 3,4-dimethoxybenzylchloride are dissolved together with 10.5 grams of phthaloxime and 9 ml. of triethylamine in 25 ml. of dimethylformamide and then heated at 96°–98° C. for about 4½ hours. When the reaction mixture has been cooled, it is poured into 200 ml. of water at about room temperature to yield a precipitate of N-(3,4-dimethoxybenzyloxy)phthalimide. After filtration, the filter cake is air dried at 20° to 25° C. and then recrystallized from pyridine. The recrystallized N-(3,4-dimethoxybenzyloxy)phthalimide obtained melts at 142°–144° C.

EXAMPLE 2

Preparation of 3,4-dimethoxybenzyloxyamine; 2.4 ml. of hydrazine are added to 16.94 grams of N-(3,4-dimethoxybenzyloxy)-phthalimide previously dissolved in about 100 in 150 ml. of boiling acetonitrile. The mixture is allowed to stand for 20 minutes after which it is filtered. The filter cake is discarded while the filtrate is evaporated to give a semi-crystalline mass of the reaction product 3,4-dimethoxybenzyloxyamine. The amine base is converted to its hydrochloride salt by dissolving it in acetonitrile and then adding 8.5 ml. of an ethereal solution of 3.3 N. HCl. The hydrogen chloride addition salt readily crystallizes out of solution. After filtration, the crystals are washed with 95% ethyl alcohol and dried at 80° C. The dried 3,4-dimethoxybenzyloxyamine hydrochloride thus obtained melts at 152° to 153° C.

EXAMPLE 3

N-(3,4,5-trimethoxybenzyloxy)phthalimide

To a solution of 9.05 g. (50 mmoles) of N-hydroxyphthalimide in 150 ml. of dimethylformamide is added a solution of 50 mmoles of potassium hydroxide in 50 ml. of methanol followed by a solution of 11.8 g. (54 mmoles) of 3,4,5-trimethoxybenzylchloride in 150 ml. of dimethylformamide. The mixture is kept at 65° for 3 hours during which time the color gradually changes from red to colorless. The solvent is removed to ca. 0.05 mm. on a rotary evaporator and 150 ml. of water added to the residue. The solid is filtered and recrystallized from a mixture of 50 ml. or dimethylformamide and 150 ml. of methanol to give 18.7 g. (72%) of fluffy needles of N-(3,4,5-trimethoxybenzyloxy)phthalimide, M.P. 140–141°.

EXAMPLE 4

3,4,5-trimethoxybenzyloxyamine

In the same way as described in Example 2, N-(3,4,5-trimethoxybenzyloxy)phthalimide is treated with hydrazine to yield 3,4,5-trimethoxybenzyloxyamine hydrochloride, M.P. 185 to 186° C.

EXAMPLE 5

3,4-dihydroxybenzyloxyamine, cyclic carbonate, hydrobromide

To a solution of 6.06 g. of N-carbobenzyloxy-3,4-carbonyldioxybenzyloxyamine, cyclic carbonate, in 10 ml. of acetic acid is added 40 ml. of 2 N hydrogen bromide in acetic acid. The mixture is heated to 70° for 10 minutes. The evolution of carbon dioxide ceases after ca. 5 minutes. The cooled solution is diluted with 150 ml. of ether to give 3.5 g. (67%) of nearly white crystals, M.P. 173–176° C.

EXAMPLE 6

3,4-dihydroxybenzyloxyamine hydrobromide

A solution of 3.5 g. of the above cyclic carbonate hydrobromide in 50 ml. of water is heated at reflux under nitrogen for 15 minutes and evaporated to dryness on a rotary evaporator. The residual solid is recrystallized by dissolving the crude product in 10 ml. of warm acetonitrile, adding 30 ml. of ethyl acetate and adding ether just to the point of turbidity. Upon cooling, the product separated as an oil which soon crystallizes to give 3.1 g. (100%) of 3,4-dihydroxybenzylaminehydrobromide.

It is to be understood that the foregoing detailed description is given merely by way of illustration and that many variations may be made therein without departing from the spirit of my invention.

Having described my invention, what I desire to secure by Letters Patent is:

1. Process for the production of the hydrobromide of the compound of the formula:

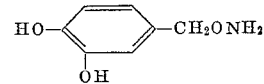

which comprises contacting a compound of the formula:

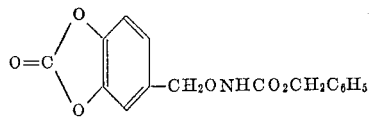

in an acetic acid solution with hydrogen bromide and heating the mixture to produce an intermediate reaction product, which intermediate reaction product is put in aqueous solution, heated at reflux under nitrogen and then evaporated to dryness to produce said hydrobromide compound.

References Cited

UNITED STATES PATENTS 3,226,446  12/1965  Drain et al. _____ 260—621

BERNARD HELFIN, *Primary Examiner.*